US012789927B2

(12) United States Patent
Park et al.

(10) Patent No.: US 12,789,927 B2
(45) Date of Patent: Nov. 10, 2026

(54) DRIVING ROBOT

(71) Applicant: LG ELECTRONICS INC., Seoul (KR)

(72) Inventors: Jeongho Park, Seoul (KR); Baekchul Kim, Seoul (KR); Mingon Kim, Seoul (KR); Youngeun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 269 days.

(21) Appl. No.: 18/651,062

(22) Filed: Apr. 30, 2024

(65) Prior Publication Data

US 2025/0178683 A1 Jun. 5, 2025

(30) Foreign Application Priority Data

Dec. 1, 2023 (KR) ........................ 10-2023-0172464

(51) Int. Cl.
*B62D 57/028* (2006.01)
*G05D 1/46* (2024.01)

(52) U.S. Cl.
CPC ............. *B62D 57/028* (2013.01); *G05D 1/46* (2024.01)

(58) Field of Classification Search
CPC ............................ B62D 57/024; B62D 57/028
See application file for complete search history.

(56) References Cited

U.S. PATENT DOCUMENTS

2019/0367112 A1 12/2019 Kim

FOREIGN PATENT DOCUMENTS

| | | | | |
|---|---|---|---|---|
| CN | 103693123 B | * 1/2016 | | |
| CN | 112172956 | 1/2021 | | |
| CN | 112998967 | 6/2021 | | |
| CN | 114802519 | 7/2022 | | |
| KR | 20090103357 A | * 10/2009 | | A61G 5/10 |
| WO | WO-2014157863 A1 | * 10/2014 | | B62D 57/024 |

OTHER PUBLICATIONS

European Patent Office Application Serial No. 24180105.9, Search Report dated Dec. 13, 2024, 13 pages.

* cited by examiner

*Primary Examiner* — William C Joyce
(74) *Attorney, Agent, or Firm* — LEE, HONG, DEGERMAN, KANG & WAIMEY

(57) ABSTRACT

A driving robot that can overcome a difference between stairs by using rotation of a protruding support unit when encountering an obstacle such as stairs while driving, and a method for controlling the same are disclosed. A driving robot for overcoming one or more steps includes a body formed to allow various members to be mounted thereon, at least one wheel located below the body and configured to provide a driving function, a wheel motor configured to drive the wheel, a step overcoming module provided to be rotatable on the same line as an axis of the wheel motor so that the driving robot overcomes at least one step while driving, and a controller configured to control the wheel and the step overcoming module. The step overcoming module includes a stepping unit that includes a support unit that protrudes longer than a radius of the wheel. The controller enables the stepping unit to rotate so that the support unit touches a top of the step and moves the wheel to a top surface of the step.

15 Claims, 7 Drawing Sheets

DRIVING ROBOT

CROSS-REFERENCE TO RELATED APPLICATION

Pursuant to 35 U.S.C. § 119 (a), this application claims the benefit of earlier filing date and right of priority to Korean Patent Application No. 10-2023-0172464, filed on Dec. 1, 2023, the contents of which are hereby incorporated by reference herein in its entirety.

BACKGROUND OF THE DISCLOSURE

Field of the Disclosure

The present disclosure relates to a driving robot and a method for controlling the same, and more particularly to a driving robot that can overcome a difference between stairs (i.e., a step difference) by using rotation of a protruding support unit when encountering an obstacle such as stairs while driving, and a method for controlling the driving robot.

Discussion of the Related Art

To take charge of a portion of factory automation, robots have been developed for industrial use. Recently, fields of application of the robot have been expanding, and not only a medical robot and an aerospace robot, but also a robot that may be used in daily life are being developed.

Among industrial robots, a robot that performs a precise assembly work repeatedly performs the same operation and repeats the same operation at a specified location without an unexpected situation, so that automation using the robot took precedence.

However, the robot has not yet been actively commercialized in a transportation field, including movement, which is a field where determination on the unexpected situation may be made. However, recently, as a performance of a sensor that recognizes surroundings has improved and computer power that may quickly process and respond to recognized information has improved, the number of mobile robots is increasing.

In the industry, a robot that performs a transportation function is attracting attention, and competition is intensifying day by day. In addition to a robot that transports bulk or large items, there is a need for a robot that may perform a service of transporting small items to a destination.

In general, whereas small robots using circular wheels maintain stable contact between the ground and the wheels on flat surfaces and exhibit high driving performance, the small robots have a fundamental problem in that they cannot overcome obstacles each having the height higher than a radius of each wheel.

Existing driving robots have disadvantages in that the driving robots can drive only on flat or sloped surfaces or on the ground with a low step difference (i.e., low levels). Robots that need to provide services in environments where people live, such as delivery robots, need to overcome floor structures used by people. In particular, the driving robot may have difficulty in overcoming (or climbing over) floor structures (e.g., stairs) having either high steps (i.e., high levels) or continuous steps using the existing wheels thereof.

On the other hand, driving robots that can overcome ordinary obstacles are designed to have complicated structures or require a high level of control, thereby making commercialization difficult due to high production costs.

SUMMARY OF THE DISCLOSURE

Accordingly, embodiments of the present disclosure are directed to a driving robot that substantially obviates one or more problems due to limitations and disadvantages of the related art.

An object of the present disclosure is to provide an indoor and outdoor integrated driving robot with a mechanism that can overcome discontinuous floor surfaces (e.g., stairs) with single or multiple high step differences (also called high level differences).

Another object of the present disclosure is to provide a driving robot with lower production costs by proposing a step overcoming module that can be easily added to an existing driving robot.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a driving robot for overcoming one or more steps may include a body formed to allow various members to be mounted thereon; at least one wheel located below the body and configured to provide a driving function; a wheel motor configured to drive the wheel; a step overcoming module provided to be rotatable on the same line as an axis of the wheel motor so that the driving robot overcomes at least one step while driving; and a controller configured to control the wheel and the step overcoming module, wherein the step overcoming module includes a stepping unit that includes a support unit that protrudes longer than a radius of the wheel; and the controller enables the stepping unit to rotate so that the support unit touches a top of the step and moves the wheel to a top surface of the step.

The controller may be configured to transition to any one of a driving mode in which the wheel is driven to rotate in a forward direction and the stepping unit is kept stationary at a preset position, and a step overcoming mode in which the wheel is driven to stop or rotate and the stepping unit is driven to rotate.

The controller may be configured to transition from the driving mode to the step overcoming mode when detecting a driving unavailable state in which a bottom surface of the body contacts stairs or the driving robot does not move forward due to a step while driving.

The controller may be configured to transition from the step overcoming mode to the driving mode when it is detected that the driving unavailable state has ended.

The step overcoming module may further include a frame connected to the body and configured to mount the stepping unit thereon; a drive gear mounted on the frame to rotate the stepping unit; and a drive motor configured to drive the drive gear.

The stepping unit may include a ring gear provided with teeth located on an inner surface of a ring, and configured to be engaged with the drive gear; and the support unit formed in a shape in which a local portion of an outer surface of the ring gear extends outward.

The step overcoming module may further include a manual pinion mounted on the frame, configured to rotate freely while engaging with the ring gear of the stepping unit, and configured to allow the stepping unit to rotate stably.

The support unit may include an anti-slip unit provided at an end of the support unit.

The driving robot may further include a disc-shaped outer case located between the wheel and the step overcoming module to prevent interference between the wheel and the step overcoming module.

The wheels may include at least one front wheel located at a front side of the body and at least one rear wheel located at a rear side of the body, and the step overcoming module may be provided in the rear wheel.

In accordance with another aspect of the present disclosure, a method for controlling a driving robot configured to overcome a step may include: performing a driving mode in which at least one front wheel and at least one rear wheel rotate in a forward direction and a stepping unit of a step overcoming module installed on the rear wheel is stopped at a preset position; and performing a step overcoming mode that allows the driving robot to overcome the step, wherein the step overcoming mode includes a first operation in which the front wheels overcome the step, a second operation in which a step detection sensor detects a driving unavailable state of the driving robot, a third operation in which a controller operates the stepping unit of the step overcoming module, and a fourth operation in which the stepping unit is driven to rotate and steps on a top of the step by using a support unit of the stepping unit, so that the rear wheels of the driving robot overcome the step.

The step overcoming step may include a fifth operation in which the step detection sensor detects that the driving robot has completed step overcoming of the driving robot; and a sixth operation in which the controller returns the stepping unit of the step overcoming module to the preset position.

The method may further include repeatedly performing the first operation, the second operation, the third operation, and the fourth operation when there is one or more steps or stairs.

The driving unavailable state may refer to any one of a first state in which the step was detected, a second state in which a bottom surface of a body of the driving robot contacts the step, and a third state in which the rear wheels cannot overcome the step.

The second operation may be configured such that the step detection sensor uses at least one of pre-stored map information, a GPS, a contact detection sensor, and a front sensor.

The preset position may be any one of a first position where the support unit is accommodated in a body of the driving robot and a second position where the support unit is directed toward the body of the driving robot.

In the step overcoming operation, the stepping unit may rotate only in the same direction as a forward rotation direction of the front wheels.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF THE DISCLOSURE

Figure 1:
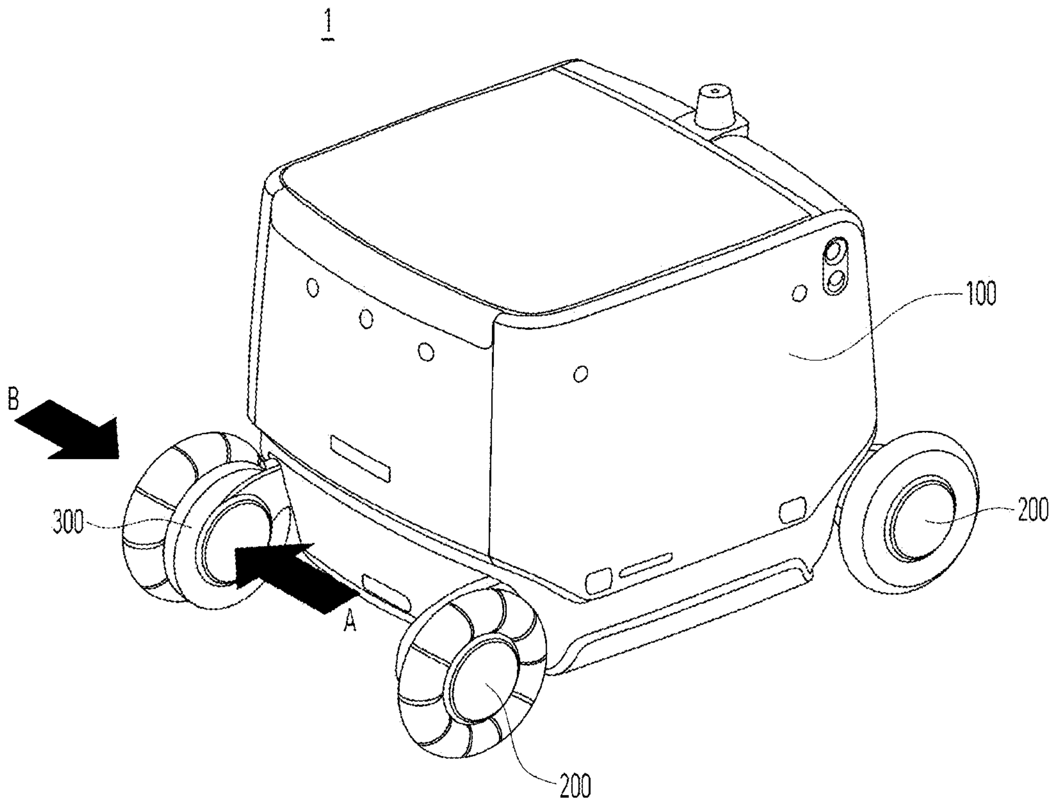
FIG. 1 is a view illustrating a driving robot according to an embodiment of the present disclosure.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions, or steps, disclosed in the specification, and it is also understood that greater or fewer components, functions, or steps may likewise be utilized.

A robot is a machine device capable of automatically performing a certain task or operation. The robot may be controlled by an external control device or may be embedded in the control device. The robot can perform tasks that are difficult for humans to perform, such as repeatedly processing only a preset operation, lifting a heavy object, performing precise tasks or a hard task in extreme environments.

In order to perform such tasks, the robot includes a driver such as an actuator or a motor, so that the robot can perform various physical operations, such as moving a robot joint.

Industrial robots or medical robots having a specialized appearance for specific tasks due to problems such as high manufacturing costs and dexterity of robot manipulation were the first to be developed. Whereas industrial and medical robots are configured to repeatedly perform the same operation in a designated place, mobile robots have recently been developed and introduced to the market. Robots for use in the aerospace industry can perform exploration tasks or the like on distant planets that are difficult for humans to directly go to, and such robots have a driving function.

In order to perform the driving function, the robot has a driver, wheel(s), a frame, a brake, a caster, a motor, etc. In order for the robot to recognize the presence or absence of surrounding obstacles and move while avoiding the surrounding obstacles, an evolved robot equipped with artificial intelligence has recently been developed.

Artificial intelligence refers to a technical field for researching artificial intelligence or a methodology for implementing the artificial intelligence. Machine learning refers to a technical field for defining various problems handled in the artificial intelligence field and for researching methodologies required for addressing such problems. Machine learning is also defined as an algorithm that improves performance of a certain task through continuous experience.

An artificial neural network (ANN) is a model used in machine learning, and may refer to an overall model having problem solving ability, which is composed of artificial neurons (nodes) that form a network by a combination of synapses. The artificial neural network (ANN) may be defined by a connection pattern between neurons of different layers, a learning process of updating model parameters, and an activation function of generating an output value.

The artificial neural network (ANN) may include an input layer and an output layer, and may optionally include one or more hidden layers. Each layer includes one or more neurons, and the artificial neural network (ANN) may include a synapse that interconnects neurons and other neurons.

In the artificial neural network (ANN), each neuron may output a function value of an activation function with respect to input signals received through synapses, weights, and deflection.

A model parameter may refer to a parameter determined through learning, and may include the weight for synapse connection and the deflection of neurons. In addition, the hyperparameter refers to a parameter that should be set before learning in a machine learning algorithm, and includes a learning rate, the number of repetitions, a mini-batch size, an initialization function, and the like.

The purpose of training the artificial neural network (ANN) can be seen as determining model parameters that minimize a loss function according to the purpose of the robot or the field of use of the robot. The loss function can be used as an index for determining an optimal model parameter in a learning process of the artificial neural network (ANN).

Machine learning can be classified into supervised learning, unsupervised learning, and reinforcement learning according to learning methods.

Supervised learning refers to a method for training the artificial neural network (ANN) in a state where a label for learned data is given. Here, the label may refer to a correct answer (or a resultant value) that should be inferred by the artificial neural network (ANN) when the learned data is input to the artificial neural network (ANN). Unsupervised learning may refer to a method for training the artificial neural network (ANN) in a state where a label for learned data is not given. Reinforcement learning may refer to a learning method in which an agent defined in the certain environment learns to select an action or sequence of actions that can maximize cumulative compensation in each state.

Among artificial neural networks, machine learning implemented as a deep neural network (DNN) including a plurality of hidden layers is also referred to as deep learning, and deep learning is a part of machine learning. Hereinafter, machine learning is used in a sense including deep learning.

Artificial intelligence (AI) technology is applied to the robot, so that the robot can be implemented as a guide robot, a transportation robot, a cleaning robot, a wearable robot, an entertainment robot, a pet robot, and an unmanned aerial robot, etc.

The robot may include a robot control module for controlling operation thereof, and the robot control module may refer to a software module or a chip implemented in hardware.

By means of sensor information obtained from various types of sensors, the robot may acquire state information of the robot, may detect (recognize) the surrounding environment and the object, may generate map data, may determine a travel route and a travel plan, may determine a response to user interaction, or may determine a necessary operation.

The robot may perform the above-described operations using a learning model composed of at least one artificial neural network (ANN). For example, the robot may recognize the surrounding environment and object using a learning model, and may determine a necessary operation using the recognized surrounding environment information or object information. Here, the learning model may be directly learned from the robot or learned from an external device such as an AI server.

In this case, whereas the robot can perform a necessary operation by directly generating a result using the learning model, the robot may also perform an operation by transmitting sensor information to an external device such as an AI server and receiving the resultant information generated thereby.

The robot can perform autonomous driving through artificial intelligence. Autonomous driving refers to a technique in which a movable object such as a robot can autonomously determine an optimal path by itself and can move while avoiding collision with an obstacle. The autonomous driving technique currently being applied may include a technique in which the movable object (e.g., a robot) can travel while maintaining a current driving lane, a technique in which the movable object can travel while automatically adjusting a driving speed such as adaptive cruise control, a technique in which the movable object can automatically travel along a predetermined route, and a driving technique in which, after a destination is decided, a route to the destination is automatically set.

In order to perform autonomous driving, the movable object such as the robot may include a large number of sensors to recognize data of the surrounding situation. For example, the sensors may include a proximity sensor, an illumination sensor, an acceleration sensor, a magnetic sensor, a gyro sensor, an inertial sensor, an RGB sensor, an infrared (IR) sensor, a fingerprint recognition sensor, an ultrasonic sensor, an optical sensor, a microphone, a lidar, a radar, and the like.

The robot can perform autonomous driving not only based on information collected by sensors, but also based on image information collected by an RGBC camera and an infrared (IR) camera and sound information collected through a microphone. In addition, the robot can travel based on information received through a user input unit. Map data, location information, and information about peripheral situations can be collected through a wireless communication unit. The collected information is requisite for autonomous driving.

Map data may include object identification information for various objects disposed in a space where the robot moves. For example, the map data may include object identification information for fixed objects such as a wall and a door, and other object identification information for movable objects such as a flowerpot and a desk. In addition, the object identification information may include a name, a type, a distance, a location, etc.

Therefore, the robot may essentially include sensors, various input units, a wireless communication unit, and the like to collect data that can be learned by artificial intelligence, and can perform optimal operations by synthesizing various types of information. The learning processor for performing artificial intelligence can perform learning by being mounted in a controller embedded in the robot, can transmit the collected information to a server, can perform learning through the server, and can retransmit the learned result to the robot, so that the robot can perform autonomous driving based on the learned result.

A robot equipped with artificial intelligence can collect the surrounding information even in a new place to implement the entire map, and a large amount of information about a place of the major activity zone can be accumulated, so that the robot can perform more accurate autonomous driving.

The robot may include a touchscreen or a button to receive a user input, and may receive a command by recognizing a user's voice. In order to convert a voice input signal into a character string, the processor may obtain information about the intention corresponding to the user input using at least one of a speech to text (STT) engine for converting a voice input into a character string and a natural language processing (NLP) engine for obtaining information about the intention of natural language.

In this case, at least one of the STT engine and the NLP engine may include an artificial neural network (ANN) trained by a machine learning algorithm. In addition, at least one of the STT engine and the NLP engine may be trained by the learning processor, may be trained by the learning processor of the AI server, or may be trained by distributed processing of the trained results.

Hereinafter, the configuration of a driving robot 1 according to an embodiment of the present disclosure will be described with reference to FIGS. 1 to 3. FIG. 1 is a view illustrating the driving robot 1 according to an embodiment of the present disclosure.

The driving robot 1 may be implemented for various purposes, such as a guidance robot, a transportation robot, a cleaning robot, an entertainment robot, and a rescue robot. In particular, the driving robot 1 according to an embodiment of the present disclosure may refer to a robot designed to transport goods. In other words, the driving robot 1 may be a robot that can transport goods from a departure to a destination, but is not limited thereto, and it should be noted that the driving robot 1 may include all kinds of driving robots 1.

In addition, the driving robot 1 can drive (or travel) indoors as well as outdoors. The driving robot 1 may be implemented as an automated guided vehicle (AGV), and the AGV may be a driving device that moves by sensors installed on the floor, magnetic fields, vision devices, etc.

The driving robot 1 may include a body 100, a wheel unit 200, a step overcoming module 300, a controller 400, etc.

The body 100 of the driving robot 1 may be formed in a box shape capable of loading articles or goods therein, or may be formed in a frame to which members can be mounted.

The wheel unit 200 may be located below the body 100, and may provide a driving function. The wheel unit 200 may include at least one wheel 201 and a wheel motor 210. One or more wheel units 200 may be provided as necessary. Preferably, the wheel unit 200 may employ four-wheel driving, but is not limited thereto. For example, the wheel unit 200 may also be provided at the end of a leg located below the body 100. Alternatively, only the wheel unit 200 may be provided without leg(s).

The step overcoming module 300 may be rotatable on the same line as the axis of the wheel motor 210 that drives the wheel 201. The step overcoming module 300 may enable the driving robot 1 to overcome at least one step while driving. The driving robot 1 with a simple structure is configured to overcome steps without complex configuration and control, and has advantages in terms of costs and maintenance compared to a conventional driving robot that can overcome steps. The configuration of the step overcoming module 300 will be described in detail later with reference to FIGS. 2 and 3.

The controller 400 can control the wheel unit 200 and the step overcoming module 300. At least one controller 400 may be provided. If necessary, the controller 400 may separately control each of the wheel unit 200 and the step overcoming module 300. The controller 400 can move the wheel 201 to a top surface of the step by rotating a stepping unit 310 so that the support unit 311 of the step overcoming module 300 can touch the top of the step.

Figure 2:
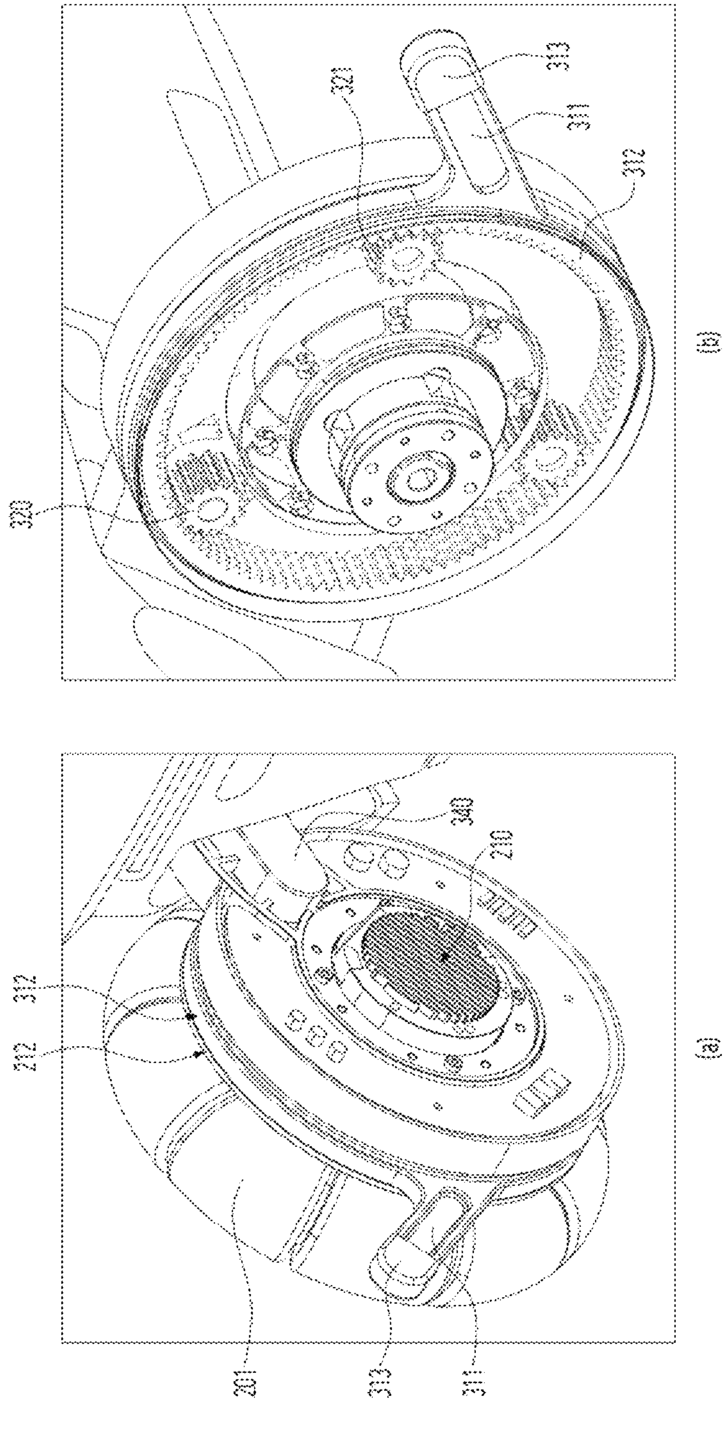
FIG. 2 is a cross-sectional view illustrating a step overcoming module of the driving robot according to an embodiment of the present disclosure.

FIG. 2 is a cross-sectional view illustrating the step overcoming module 300 of the driving robot 1 according to an embodiment of the present disclosure. FIG. 2(*a*) is a cross-sectional diagram viewed from the direction A of FIG. 1, and FIG. 2(*b*) is a cross-sectional diagram viewed from the direction B of FIG. 1.

The wheel unit 200 of the driving robot 1 may be a general name including the wheel 201 and the wheel motor 210. The wheel motor 210 may include a wheel motor shaft 211 and an outer case 212.

The step overcoming module 300 of the driving robot 1 may include a stepping unit 310, a drive gear 320, a manual pinion 321, a frame 330, and a drive motor 340. The stepping unit 310 may include a support unit 311, a ring gear 312, and an anti-slip unit 313. The above-described constituent elements will be described in detail later with reference to FIG. 3.

Referring to FIG. 2(*a*), the wheel motor 210 configured to drive the wheel 201 and the drive motor 340 configured to drive the step overcoming module 300 may be configured separately from each other. In addition, the outer case 212 may be located between the wheel 201 and the ring gear 312 of the stepping unit 310, so that the outer case 210 can prevent the wheel 210 and the stepping unit 310 from interfering with each other when the wheels 201 are driven separately from each other.

Referring to FIG. 2(*b*), the drive gear 320 may receive power from the drive motor 340, and may transmit the received power to the ring gear 312. At this time, the manual pinion 321 may be mounted on the frame, and may rotate freely in engagement with the ring gear 312, thereby holding the ring gear 312 to be stably rotated without any shaking.

The support unit 311 and the anti-slip unit 313 may be connected to the ring gear 312, and may rotate by the ring gear 312 to allow the driving robot 1 to step on and go over the top surface of the driving robot 1, so that the driving robot 1 can overcome the step.

Hereinafter, the above-described constituent elements of the driving robot 1 will be described in more detail with reference to FIG. 3.

Figure 3:
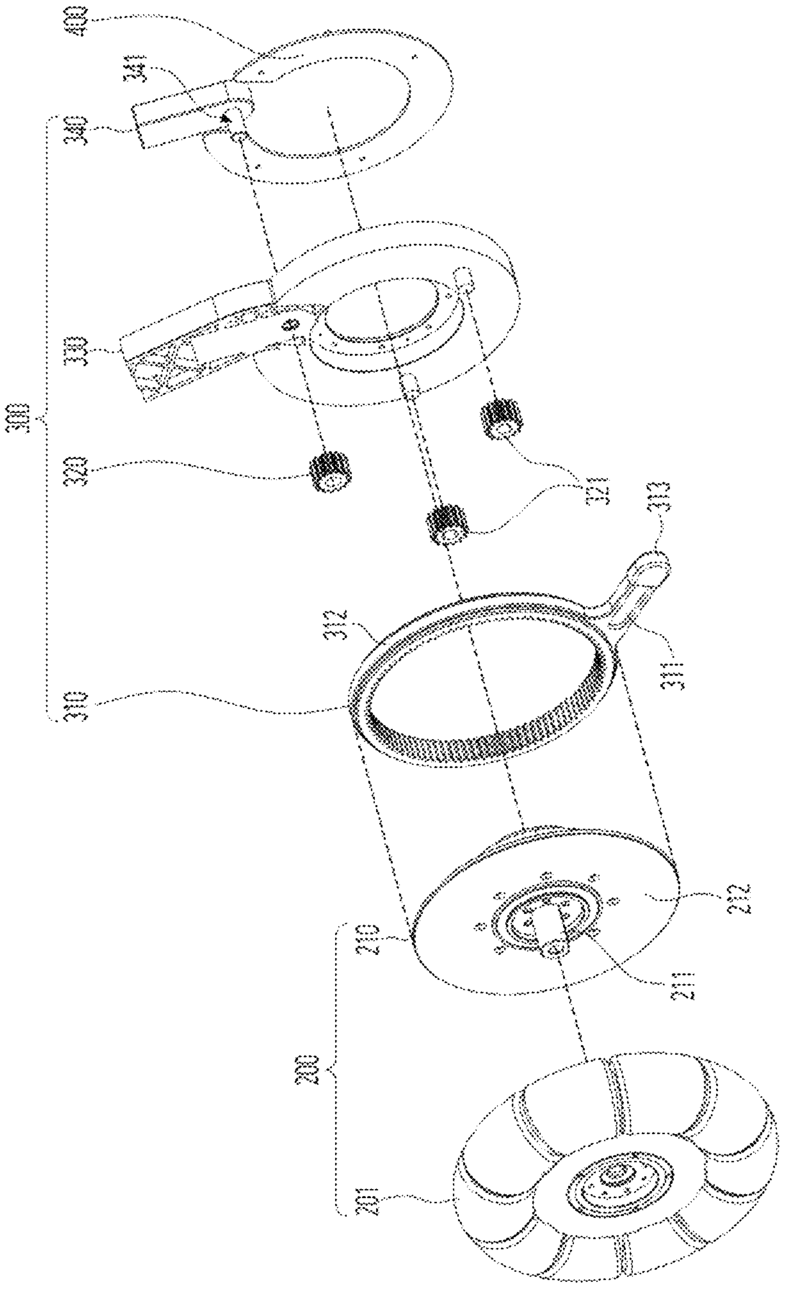
FIG. 3 is an exploded view illustrating a wheel unit and a step overcoming module of the driving robot according to an embodiment of the present disclosure.

FIG. 3 is an exploded view illustrating the wheel unit 200 and the step overcoming module 200 of the driving robot 1 according to an embodiment of the present disclosure. More specifically, FIG. 3 is an exploded perspective view illustrating the configuration of the wheel unit 200 and the step overcoming module 300 of the driving robot 1.

Referring to FIG. 3, the driving robot 1 may include the wheel unit 200 and the step overcoming module 300.

The wheel unit 200 of the driving robot 1 may be a general name including the wheel 201 and the wheel motor 210. The wheel motor 210 may include a wheel motor shaft 211 and an outer case 212.

The step overcoming module 300 of the driving robot 1 may include a stepping unit 310, a drive gear 320, a manual pinion 321, a frame 330, and a drive motor 340. The stepping unit 310 may include a support unit 311, a ring gear 312, and an anti-slip unit 313.

In addition, the driving robot 1 may include a controller 400. The controller 400 may control the wheel motor 210 or the drive motor 340. The wheel motor 210 and the drive motor 340 may be controlled simultaneously by only one controller 400. Alternatively, the wheel motor 210 and the drive motor 340 may be controlled by different controllers as necessary.

The wheel 201 may be located below the body 100 of the driving robot 1, and may provide a driving function. Each wheel may refer to a driving wheel. The wheel 201 may be configured in various types such as omni wheels, pneumatic tires, airless tires, etc. The wheel motor 210 may be a motor that drives the wheel 201. The wheel motor 210 may be driven independently of the step overcoming module 300.

The wheel motor 210 may include a wheel motor shaft 211 and an outer case 212.

The wheel motor shaft 211 may be a shaft for transmitting power to the wheel 201. That is, the wheel motor shaft 211 may be fixed to the wheel 201 and then rotate together.

The outer case 212 may serve to isolate the wheel 201 from contacting the step overcoming module 300. In other words, the outer case 212 may serve to isolate the wheel 210 and the step overcoming module 300 from each other, so that the wheel 210 and the step overcoming module 300 can be protected without interference therebetween. The outer case 212 may be located between the wheel 201 and the step overcoming module 300. Additionally, the outer case 212 may be formed in a plate shape, and in particular, may be formed in a disc shape corresponding to the shape of the wheel 201. However, the scope or spirit of the outer case 212 is not limited thereto, and any configuration capable of separating the wheel 201 and the step overcoming module 300 from each other can be used.

The step overcoming module 300 can enable the driving robot 1 to go over (or overcome) at least one obstacle such as a step while driving. The step overcoming module 300 may be rotatable on the same line as the wheel motor shaft 211. That is, the step overcoming module 300 may be provided coaxially with the wheel 201. When the wheel 201 is coaxial with the wheel 201, trajectories of the wheel 201 and the step overcoming module 300 can be predicted, but the scope of the present disclosure is not limited thereto.

The step overcoming module 300 may be provided inside or outside the wheel unit 200. Moreover, the distance between the step overcoming module 300 and the wheel 201 is also irrelevant. The step overcoming module 300 may be directly connected to the wheel 201 or may be provided at a certain distance from the wheel 201. Alternatively, the step overcoming module 300 may be directly attached to the wheel 201.

As described above, the step overcoming module 300 of the driving robot 1 may include a stepping unit 310, a drive gear 320, a manual pinion 321, a frame 330, and a drive motor 340. The stepping unit 310 may include a support unit 311, a ring gear 312, and an anti-slip unit 313.

The stepping unit 310 is a key unit in overcoming the step of the driving robot 1, and can be rotatable on the same line as the axis of the wheel motor. The stepping unit 310 may include a support unit 311 that protrudes longer than the radius of the wheel 201, and may overcome the step by rotating the support unit 311.

The support unit 311 touches and supports the top of the step to lift the wheel 201 of the driving robot 1, thereby moving the wheel 201 to the top of the step. That is, as the stepping unit 310 including the support unit 311 rotates, the support unit 311 touches the top of the step, and then the stepping unit 310 continues to rotate so that the support unit 311 lifts the wheel 201 and the body 100 while supporting the top surface of the step, thereby overcoming the steps.

The shape and position of the support unit 311 may be irrelevant, but the distance between a rotary shaft of the stepping unit 310 and the outermost end of the support unit 311 must be longer than the radius of the outer edge of the wheel 201. That is, the support unit 311 needs to protrude longer than the radius of the wheel 201. This is because the length of the support unit 311 is longer than the radius of the wheel 201 so that the support unit 311 must overcome steps that the wheel 201 cannot overcome. Therefore, a maximum height of the step that the driving robot 1 can overcome is the sum of the radius of the wheel 201 and the distance to the end of the support unit 311.

The support unit 311 may protrude longer than the radius of the wheel 201. The support unit 311 may be formed in the shape of a stick or a hoof. The support unit 311 may have a shape in which a local portion of the outer surface of the ring gear 312 extends outward. The shape of the support unit 311 may vary. This will be described in detail later with reference to FIG. 6.

The ring gear 312 may receive power from the motor, and may rotate the support unit 311, thereby allowing the driving robot 1 to go over (or climb) over steps. The ring gear 312 may be a gear that constitutes the stepping unit 310, and may be provided with teeth on an inner surface thereof. A local portion of the ring gear 312 may extend outward to form the support unit 311, or the support unit 311 may be attached to the outside of the ring gear 312. The ring gear 312 may rotate coaxially with the wheel 201. The ring gear 312 engages with the drive gear 320 and at the same time can receive power from the drive gear 320. The drive gear 320 may receive power from the drive motor 340. In other words, the ring gear 312 may receive power from the drive motor 340, not the wheel motor 210.

In this patent document, although it is assumed that the stepping unit 310 is comprised of the ring gear 312, the scope of the embodiment is not necessarily limited to the ring gear 312. Any form for rotating the support unit 311 that allows the driving robot 1 to go over (or climb over) steps should be considered possible.

The anti-slip unit 313 may be provided at the end of the support unit 311 may directly contact the ground and the top of the step, and may enable the support unit 311 to support the ground without slipping. When the driving robot 1 overcomes the step using the anti-slip unit 313 made of a material or structure with high frictional force, the anti-slip unit 313 may support the support unit 311 with frictional force without slipping and at the same time the driving robot 1 can go over (or climb over) the step. In other words, the anti-slip unit may mean an area treated to prevent slipping when the support unit 311 touches the ground. The anti-slip unit 313 can be implemented by adding a material with high friction to the end of the support unit 311, or can be implemented by enabling the end of the support unit 311 to be formed in a shape with high friction. This will be described in detail later with reference to FIG. 6.

The drive gear 320 has a shaft connected to the drive motor 340 and can transmit power from the drive motor 340 to the stepping unit 310. Referring to FIG. 3, the drive gear 320 rotates in mesh with the ring gear 312, and transmits power of the drive motor 340 to the ring gear 312, thereby rotating the ring gear 312. Since the driver gear 320 transmits power of the drive motor 340 rather than the wheel motor 210 to the ring gear 312, the stepping unit 310 can be rotated independently of the wheel 201.

The manual pinion 321 can hold the inside of the ring gear 312 so that the stepping unit 310 can stably rotates without shaking. The manual pinion 321 may have a shaft connected to the frame, may rotate freely, and may be engage with the ring gear 312.

The frame 330 may be a structure connected to the body 100 of the driving robot 1 to mount the step overcoming unit. The frame may be equipped with a drive motor 340, a drive gear 320, a manual pinion 321, etc.

The drive motor 340 may transmit power to the stepping unit 310. The drive motor 340 may be separated from the wheel motor 210 and may supply power to the step overcoming module 300. The wheel motor 210 may be different from the drive motor 340 in that the wheel motor 210 supplies power to the wheel 201. The drive motor 340 may be mounted and fixed to the frame. The drive gear 320 is connected to the shaft 341 of the drive motor 340 and can rotate by receiving power from the drive motor 340. The ring gear 312 of the stepping unit 310 is engaged with the drive gear 320, and can rotate using power of the drive motor 340. The ring gear 312 rotates together with the support unit 311, and the support unit 311 continues to rotate while stepping on the top surface of the step to lift the wheel 201, thereby overcoming the step.

At least one controller 400 may be provided, and may be implemented as a driver or a sensing board. The controller 400 is located close to the drive motor 340 and can control the drive motor 340. However, the position of the controller 400 is not limited thereto, and may be located anywhere on the driving robot 1. The controller 400 can control the wheel motor 210 or the drive motor 340. The wheel motor 210 and the drive motor 340 may be controlled simultaneously by one controller 400, or different controllers 400 may be provided to control the wheel motor 210 and the drive motor 340 as necessary.

The controller 400 may sense rotation of the drive motor 340 or the ring gear 312 to adjust the position of the ring gear 312, and may control the ring gear 312 according to various situations. For example, during the driving mode, the drive motor 340 is not driven and the position of the ring gear 312 may be maintained at a preset position. Alternatively, when changing from the step overcoming mode to the driving mode, if the position of the ring gear 312 is not the preset position, the controller 400 may enable the ring gear 312 to be rotated to the preset position.

Figure 4:
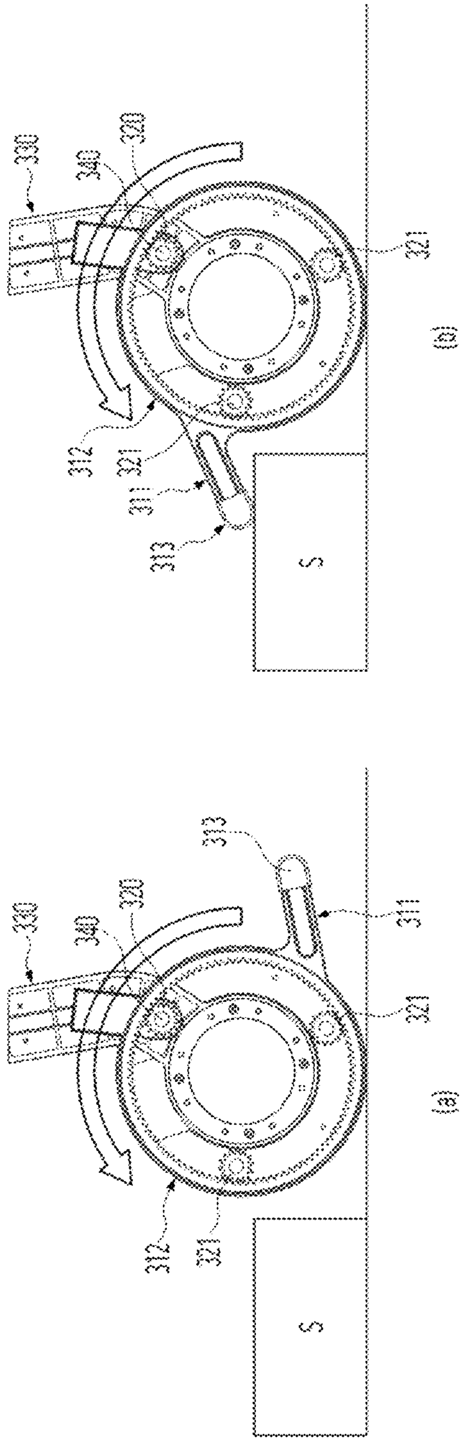
FIG. 4 is a cross-sectional view illustrating the operating principle of the step overcoming module according to an embodiment of the present disclosure.

FIG. 4 is a cross-sectional view illustrating the operating principle of the step overcoming module 300 according to an embodiment of the present disclosure.

FIG. 4(*a*) is a diagram showing the operation of the step overcoming module 300 when the driving robot 1 is in a non-running state. FIG. 4(*b*) is a diagram showing the operation of the driving robot 1 just before the driving robot 1 operates the step overcoming module 300 and attempts to overcome the step(S) in a step overcoming mode.

The step overcoming module 300 of the driving robot 1 may include a stepping unit 310, a drive gear 320, a manual pinion 321, a frame 330, and a drive motor 340. The stepping unit 310 may include a support unit 311, a ring gear 312, and an anti-slip unit 313.

When the driving robot 1 encounters an obstacle such as the step(S) while driving and is in a driving unavailable state in which the wheel 201 cannot overcome (climb over) the obstacle, the driving robot 1 may detect the driving unavailable state thereof. When the driving unavailable state is detected, the driving robot 1 can drive the step overcoming module 300 (see FIG. 4A).

The drive gear 320 may be rotated by the drive motor 340 of the step overcoming module 300. The drive gear 320 may engage with the ring gear 312 of the stepping unit 310 and rotate the ring gear 312. The support unit 311 connected to the ring gear 312 can be rotated while rotating with the ring gear 312 until the end of the support unit 311 touches the top surface of the step S (see FIG. 4B). At this time, the ring gear 312 continues to rotate, and the support unit 311 rotates while stepping on the top surface of the step(S) without slipping due to the anti-slip unit 313, so that the driving robot 1 moves over the step(S). A method for controlling the driving robot 1 to overcome steps will be described later with reference to FIG. 5.

Figure 5:
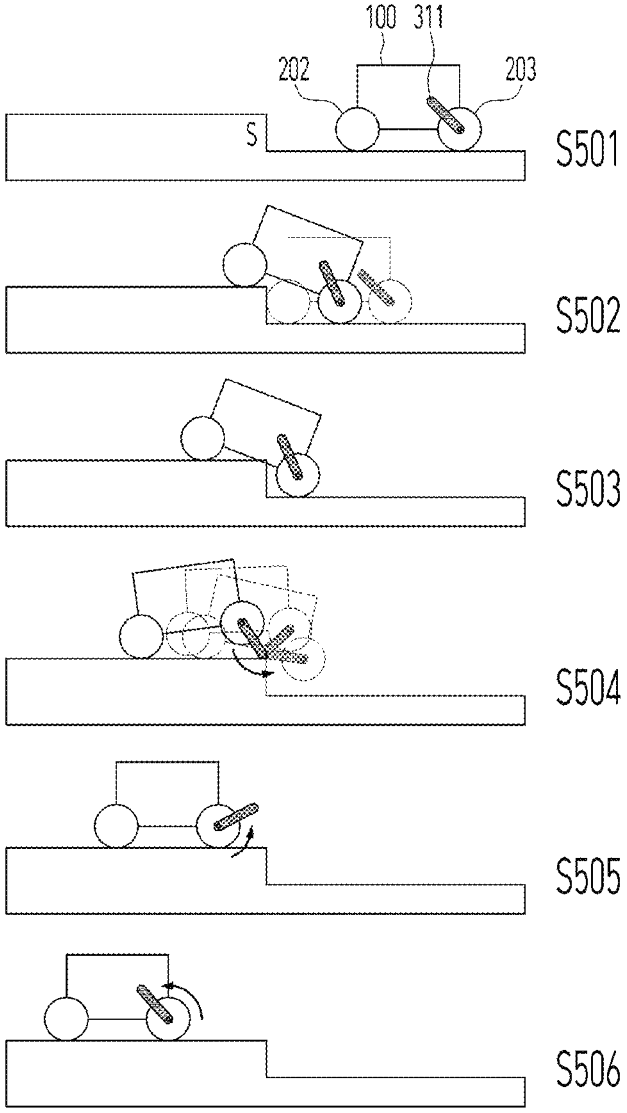
FIG. 5 is a diagram illustrating a method for controlling the driving robot according to an embodiment of the present disclosure.

FIG. 5 is a diagram illustrating a method for controlling the driving robot 1 according to an embodiment of the present disclosure. In the following description, it is assumed that the driving robot 1 is a four-wheel-drive driving robot 1. The wheels 201 and the step overcoming module 300 of the driving robot 1 may be controlled by the controller 400. The controller 400 may also be divided into the controller of the step overcoming module 300 and the wheel controller.

The driving robot 1 may be in the driving mode while driving on flat ground. In the driving mode, the front wheels 202 and the rear wheels 203 are driven to rotate in a forward direction, and the step overcoming module 300 may not be driven. At this time, the step overcoming module 300 may be in a state where the stepping unit 310 is stopped at a preset position. For example, the support unit 311 may be accommodated in the body 100 of the driving robot 1 or may be in a stationary state at a position facing the body 100 of the driving robot 1. That is, in the driving mode, the wheels 201 of the driving robot 1 may rotate in the forward direction, and the step overcoming module 300 may be stationary with the support unit 311 facing the direction of the body 100 of the driving robot 1. The support unit 311 is formed in a shape that protrudes from the wheel 201. Thus, when the driving robot 1 is running while facing outward from the body 100, the driving robot 1 may startle passers-by therearound or may be disturbed by surrounding objects, so that it is preferable that the driving robot 1 be driven while stationary at a position where the driving robot 1 faces the outside of the body 100 (S501).

Meanwhile, in the driving mode, the driving robot 1 can detect that there is a step(S) in a driving path using a pre-analyzed map, a GPS, a front sensor, or the like. When the driving robot 1 encounters the step(S) and attempts to overcome the step(S), the front wheel 202 can overcome the step(S) first while in the driving mode. That is, the front wheels 202 and the rear wheels 203 continue to rotate in the forward direction, and the front wheels 202 are pushed up above the step(S) using the friction and torque of the front wheels 202 and rear wheels 203, so that the front wheels 202 can overcome the step(S) first (S502).

The driving robot 1 may move forward until reaching the driving unavailable state in which the front wheels 202 contacts the step(S). Here, the driving unavailable state can assume a situation where the bottom of the driving robot 1 is in contact with the step(S) or the following rear wheel 203 cannot overcome the step(S). Alternatively, the driving unavailable state may be a state in which the step(S) is detected by the sensor of the driving robot 1. In other words, the driving unavailable state may refer to a situation in which the driving robot 1 cannot move forward due to the step(S) while driving. A step detection sensor of the driving robot 1 can detect such a driving unavailable state. At this time, the front wheels 202 may rotate in the forward direction and the rear wheels 203 may be in a stationary or rotating state (S503).

When the driving robot 1 is detected to be unable to drive, the controller 400 may control the driving robot 1 to transition to the step overcoming mode. In the step overcoming mode, the controller 400 may drive the wheels 201 to stop or rotate and may drive the stepping unit 310 of the step overcoming module 300 to rotate. That is, the stepping unit 310 can be rotated in the same direction as the forward rotation. At this time, the support unit 311 included in the stepping unit 310 can rotate and the end of the support unit 311 can step on the step(S). That is, the driving robot 1 may move to the top surface of the step(S) by the support unit 311 that lifts the rear wheels 203 while stepping on the top surface of the step S (S504). The stepping unit 310 may maintain the above operation until the driving robot 1 completely climbs up the step(S). Therefore, the driving robot 1 may repeatedly perform the above-described operation even on stairs with multiple steps(S), so that the driving robot 1 can overcome and climb over such stairs. At this time, the front wheels 202 may continue to rotate in the forward direction. The rear wheels 203 may be stationary or rotating.

When the driving robot 1 overcomes all steps(S) and finishes the step overcoming state, the driving robot 1 may transition again from the step overcoming mode to the driving mode again. The step detection sensor may detect such completion of the step overcoming action of the driving robot 1. For example, it is possible to detect that overcoming the step(S) has been completed by measuring the inclination (or slope) of the driving robot 1. At this time, the controller 400 may return the stepping unit 310 so that the step overcoming module 300 may go back to the original position thereof. That is, in the driving mode, the support unit 311 can return to a stationary state in a direction toward the body 100 of the driving robot 1. At this time, the stepping unit 310 may rotate in the same direction without stopping at a preset position. That is, the stepping unit 310 can return to the original position thereof while rotating in the forward direction (S505). At this time, the front wheels 202 and the rear wheels 203 may be rotating in the forward direction. The stepping unit 310 may also be rotating in the same direction as the rear wheel 203.

When the driving robot 1 overcomes all steps(S) and meets level ground again, the driving robot 1 can continue driving in the driving mode. At this time, the support unit 311 of the stepping unit 310 may be accommodated in the body 100 of the driving robot 1 in the same state as the initial state, or may be stopped in the direction toward the body 100. That is, the driving robot 1 may return to the same state as the initial driving mode (S506). At this time, the front wheels 202 and the rear wheels 203 may be rotating in the forward direction. Here, the support unit 311 may be accommodated in the body 100.

Figure 6:
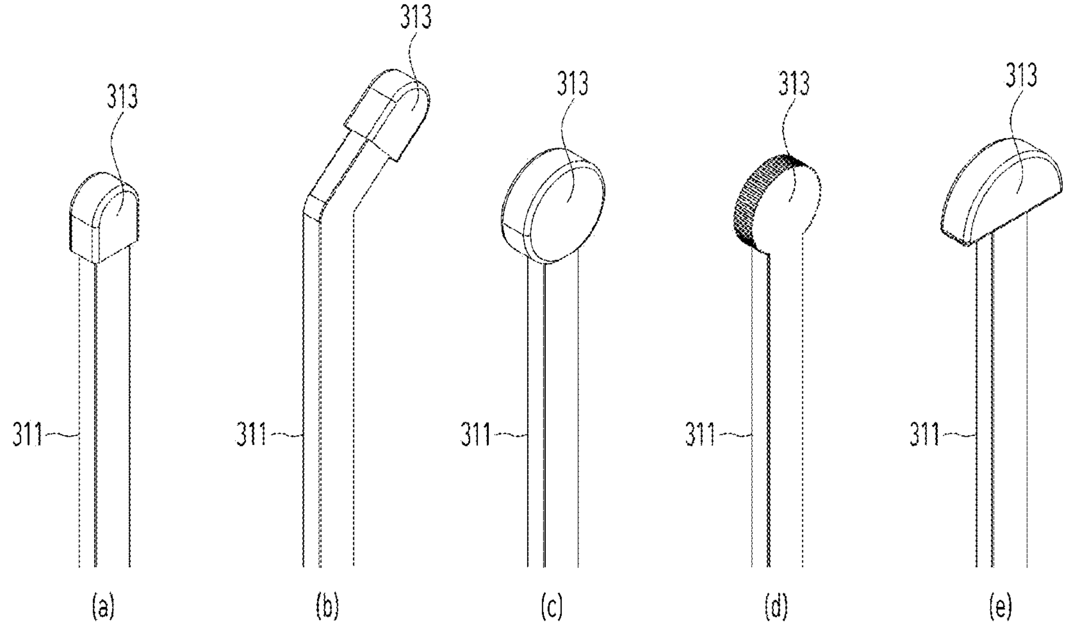
FIG. 6 is a diagram illustrating an example of an anti-slip unit according to an embodiment of the present disclosure.

FIG. 6 is a diagram showing an example of the shape of the anti-slip unit 313 according to an embodiment of the present disclosure. As can be seen from FIG. 6, the shape of the support unit 311 and the shape of the anti-slip unit 313 are listed as examples. However, each shape is not limited thereto, and any shape is possible as long as it has the features to be described later. The support unit 311 and the end shape of the support unit 311, that is, the anti-slip unit 313, can be implemented in various shapes, and five examples are shown in FIG. 6.

The support unit 311 may be sturdy enough to withstand the load of the driving robot 1. In addition, in the driving mode, the support unit 311 may be accommodated in the driving robot 1 or may be in close contact with the body 100 of the driving robot 1.

The anti-slip unit 313 may be made of a material with a high coefficient of friction to prevent the driving robot 1 from slipping when it steps on the step(S) using the support unit 311. Alternatively, anti-slip treatment may be performed on the surface of the anti-slip unit 313. Referring to FIG. 6, the anti-slip unit 313 may be in a semicircular shape (see FIG. 6(*e*)) or a circular shape (see FIG. 6(*c*)) using a high coefficient of friction material, or may be implemented as a cover shape (see FIGS. 6(*a*) and 6(*b*)) covering the end of the support unit 311. Alternatively, anti-slip treatment may be applied only to the shape (see FIG. 6(*d*)) of the end of the anti-slip unit 313.

Figure 7:
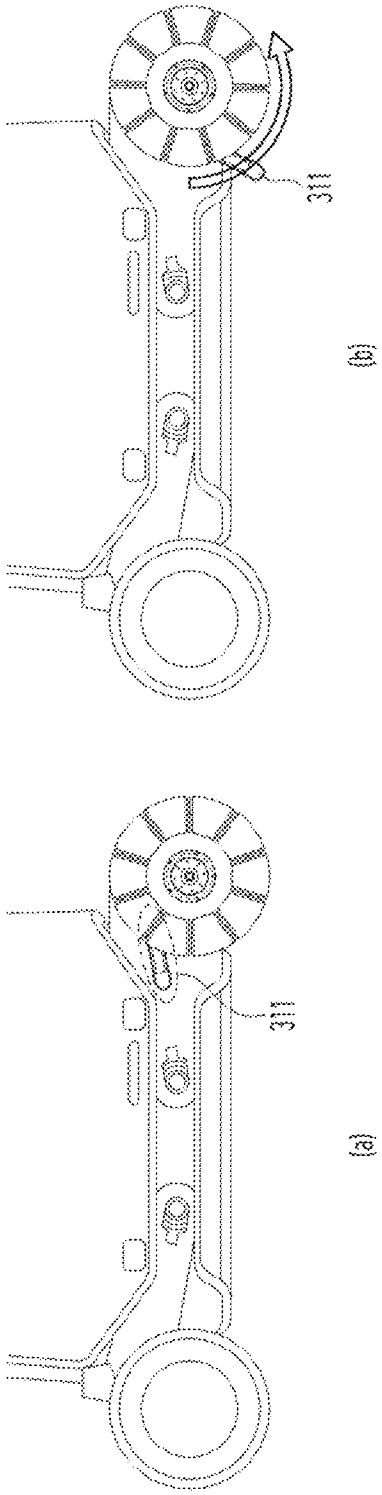
FIG. 7 is a diagram illustrating the position of a support unit in each of a driving mode and a step overcoming mode of the driving robot according to an embodiment of the present disclosure.

FIG. 7 is a diagram illustrating the position of the support unit 311 in each of the driving mode and the step overcoming mode of the driving robot 1 according to an embodiment of the present disclosure. FIG. 7(*a*) is a diagram showing the state of the driving robot 1 operating in the driving mode, and FIG. 7(*b*) is a diagram showing the state of the driving robot 1 operating in the step overcoming mode.

Referring to FIG. 7(*a*), the support unit 311 may be fixed inside the driving robot 1 in the driving mode. For example, according to a driving robot 1 equipped with wheels 201 mounted at the ends of legs thereof, the support unit 311 may be accommodated inside the legs. In other words, the driving robot 1 may be stopped in the direction of the leg structure. Meanwhile, in the case of the driving robot 1 having only wheels 201 without legs, the support unit 311 may be accommodated in the driving robot 1 so that the support unit 311 is not exposed to the outside of the wheels 201.

In addition, the support unit 311 may be present on the outer or inner surface of the wheels 201. When the support unit 311 is present on the outer surface of the wheels 201, the support unit 311 may be located to face the direction of the body 100 of the driving robot 1. When the support unit 311 is present on the inner surface of the wheels 201, the support unit 311 may be located to face the inside of the driving robot 1 so that the support unit 311 is not exposed outside.

Referring to FIG. 7(*b*), the support unit 311 may be rotating in the step overcoming mode. The support unit 311 may rotate in the same direction as the rotation direction of the front and rear wheels, and may perform an operation of stepping on and going over the ground or the top of the step. Alternatively, when the driving wheels 201 of the driving robot 1 approach a high step (having a high height), the support unit 311 may start operating. The support unit 311 may still rotate in the same direction even after the driving robot 1 stands on the support unit 311. When the driving robot 1 needs to overcome a plurality of steps, the support unit 311 can continuously rotate in the same direction. When it is detected that all steps have been overcome, the driving robot may return back to the same position as in the driving mode.

As is apparent from the above description, according to at least one embodiment of the present disclosure, even if the driving robot encounters discontinuous ground with a single or multiple high step (or high level) differences, such as stairs, while driving, the driving robot can continue to drive while continuously overcoming step differences (or level differences) on the ground using a step overcoming module having a simple structure.

The driving robot according to at least one embodiment of the present disclosure can guarantee the driving stability of the existing driving robot, and at the same time can overcome high step differences by adding a simple structure to the existing driving robot without changing the existing driving mechanism, so that the physical stability of the driving robot can be guaranteed.

The driving robot according to at least one embodiment of the present disclosure may be designed to have a simple structure while overcoming step differences using an easy control method, so that production costs of the driving robot can be reduced, thereby enabling commercialization of the driving robot with low production costs.

According to at least one embodiment of the present disclosure, the driving robot can move or drive by power of the support unit itself, and can reduce the load of the wheel motor embedded therein. In addition, the driving robot is provided with the support unit embedded therein, so that the driving robot can guarantee the safety of peripheral pedestrians while driving without any influence upon the external appearance thereof.

The above detailed description is to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

What is claimed is:

1. A driving robot for overcoming one or more vertical steps, the driving robot comprising:
- a body formed to allow various members to be mounted thereon;
- a wheel located below the body and configured to provide a driving function;
- a wheel motor configured to drive the wheel;
- a step overcoming device that is rotatable on a same line as an axis of the wheel motor; and
- a controller configured to control the wheel and the step overcoming device, wherein the step overcoming device includes a stepping device that includes:
- a ring gear provided with teeth located on an inner surface of the ring gear; and
- a support formed in a shape in which a local portion of an outer surface of the ring gear extends outward,
- a frame connected to the body and configured to mount the stepping device thereon,
- a drive gear mounted on the frame and configured to engage with or disengage from the ring gear and rotate the stepping device, and
- a drive motor configured to drive the drive gear, wherein the support protrudes longer than a radius of the wheel, and wherein the controller enables the stepping device to rotate so that the support device touches a top of a step of the one or more vertical steps and moves the wheel to a top surface of the step.

2. The driving robot according to claim 1, wherein the controller is configured to transition between:
- a driving mode in which the wheel is driven to rotate in a forward direction and the stepping device is kept stationary at a preset position; and
- a step overcoming mode in which the wheel is driven to stop or rotate and the stepping device is driven to rotate.

3. The driving robot according to claim 2, wherein the controller is configured to:
- transition from the driving mode to the step overcoming mode upon detecting a driving unavailable state in which a bottom surface of the body contacts the one or more vertical steps or the driving robot does not move forward due to detecting the one or more vertical steps while in the driving mode.

4. The driving robot according to claim 3, wherein the controller is configured to:
- transition from the step overcoming mode to the driving mode upon detecting that the driving unavailable state has ended.

5. The driving robot according to claim 1, wherein the step overcoming device further includes:
- a manual pinion mounted on the frame, configured to rotate freely while engaging with the ring gear of the stepping device, and configured to allow the stepping device to rotate stably.

6. The driving robot according to claim 1, wherein the support includes:
- an anti-slip device provided at an end of the support.

7. The driving robot according to claim 1, further comprising:
- a disc-shaped outer case located between the wheel and the step overcoming device to prevent interference between the wheel and the step overcoming device.

8. The driving robot according to claim 1, wherein:
- the wheel is one of a plurality of wheels which include a front wheel located at a front side of the body and a rear wheel located at a rear side of the body; and
- the step overcoming device is provided in the rear wheel.

9. A method for controlling a driving robot that is configured to overcome one or more vertical steps, the method performed by a controller of the driving robot and comprising:
- controlling the driving robot to operate in a driving mode, in which:
- a front wheel and a rear wheel of the driving robot rotate in a forward direction, and
- a stepping device of a step overcoming device installed on the rear wheel is stopped at a preset position; and
- controlling the driving robot to operate in a step overcoming mode that allows the driving robot to overcome a step of the one or more vertical steps,
- wherein the step overcoming device includes:
  - a ring gear provided with teeth located on an inner surface of the ring gear,
  - a support device formed in a shape in which a local portion of an outer surface of the ring gear extends outward,
  - a drive gear configured to engage with or disengage from the ring gear, and
  - a drive motor configured to drive the drive gear, and
- wherein the step overcoming mode includes:

a first operation in which the front wheel overcomes the step, a second operation in which a step detection sensor in the driving robot detects a driving unavailable state of the driving robot, a third operation of operating the stepping device of the step overcoming device, and a fourth operation of rotating the stepping device and causing the stepping device to step on a top of the step by using a support device of the stepping device, so that the rear wheel of the driving robot overcomes the step.

10. The method according to claim 9, wherein the step overcoming step includes:

a fifth operation in which the step detection sensor detects that the driving robot has completed step overcoming of the driving robot; and a sixth operation in which the controller returns the stepping device of the step overcoming device to the preset position.

11. The method according to claim 10, wherein:

in the step overcoming mode, the stepping device is configured to rotate only in a same direction as a forward rotation direction of the front wheels.

12. The method according to claim 9, further comprising:

repeatedly performing the first operation, the second operation, the third operation, and the fourth operation for additional steps of the one or more vertical steps.

13. The method according to claim 9, wherein:

the driving unavailable state comprises one of a first state in which the step was detected, a second state in which a bottom surface of a body of the driving robot contacts the step, or a third state in which the rear wheel cannot overcome the step.

14. The method according to claim 9, wherein:

the second operation is configured such that the step detection sensor uses at least one of pre-stored map information, a GPS, a contact detection sensor, or a front sensor.

15. The method according to claim 9, wherein:

the preset position is any one of a first position where the support device is accommodated in a body of the driving robot or a second position where the support device is directed toward the body of the driving robot.

* * * * *